United States Patent
Bishop et al.

(10) Patent No.: US 10,885,678 B2
(45) Date of Patent: Jan. 5, 2021

(54) FACILITATING QUANTUM TOMOGRAPHY

(71) Applicant: International Business Machines Corporation, Armonk, NY (US)

(72) Inventors: Lev Samuel Bishop, Dobbs Ferry, NY (US); Andrew W. Cross, Yorktown Heights, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/720,841

(22) Filed: Sep. 29, 2017

(65) Prior Publication Data

US 2019/0102917 A1 Apr. 4, 2019

(51) Int. Cl.
| | |
|---|---|
| *G06K 9/00* | (2006.01) |
| *G06T 11/00* | (2006.01) |
| *G06N 10/00* | (2019.01) |
| *G06T 1/20* | (2006.01) |
| *G06N 20/00* | (2019.01) |

(52) U.S. Cl.
CPC ............ *G06T 11/005* (2013.01); *G06N 10/00* (2019.01); *G06T 1/20* (2013.01); *G06N 20/00* (2019.01); *G06T 2200/28* (2013.01); *G06T 2211/40* (2013.01)

(58) Field of Classification Search
CPC . G06T 2207/10072; G06T 2207/20081; G06T 2200/21
See application file for complete search history.

(56) References Cited

U.S. PATENT DOCUMENTS

| 6,218,832 B1 * | 4/2001 | Chuang | B82Y 10/00 324/300 |
| 7,383,235 B1 * | 6/2008 | Ulyanov | B82Y 10/00 706/13 |
| RE41,900 E * | 10/2010 | Tucci | B82Y 10/00 706/52 |

(Continued)

FOREIGN PATENT DOCUMENTS

| CN | 1602809 A | 4/2005 |
| EP | 2 477 112 A1 | 7/2012 |
| JP | H0990041 A | 4/1997 |

OTHER PUBLICATIONS

Blaha et al., Quantum Computers and Quantum Computer Languages: Quantum Assembly Language and Quantum C Language, 2002, Quantum Physics, arXiv:quant-ph/0201082, pp. 1-32.*

(Continued)

*Primary Examiner* — Guillermo M Rivera-Martinez
(74) *Attorney, Agent, or Firm* — Amin, Turocy & Watson, LLP

(57) ABSTRACT

Techniques for facilitating quantum tomography are provided. In one example, a system includes a circuit generation component and a tomography analysis component. The circuit generation component generates tomography experiment data indicative of information for a set of tomography experiments based on quantum circuit data indicative of a machine-readable description of a quantum circuit. The tomography analysis component generates tomogram data based on experimental result data indicative of information associated with the tomography experiment data.

25 Claims, 10 Drawing Sheets

(56) References Cited

U.S. PATENT DOCUMENTS

| | | | | |
|---|---|---|---|---|
| 8,510,618 | B1* | 8/2013 | Pesetski | G06F 11/1048 257/34 |
| 8,776,013 | B2 | 7/2014 | Riehl et al. | |
| 9,530,873 | B1* | 12/2016 | Carroll | H01L 29/66977 |
| 9,537,953 | B1 | 1/2017 | Dadashikelayeh et al. | |
| 9,727,824 | B2 | 8/2017 | Rose et al. | |
| 2003/0121028 | A1* | 6/2003 | Coury | B82Y 10/00 717/138 |
| 2005/0063518 | A1 | 3/2005 | Nukui | |
| 2005/0224784 | A1* | 10/2005 | Amin | B82Y 10/00 257/14 |
| 2006/0260016 | A1* | 11/2006 | Greentree | B82Y 10/00 257/312 |
| 2011/0276296 | A1* | 11/2011 | Walmsley | G01J 11/00 702/85 |
| 2014/0126030 | A1* | 5/2014 | Crespi | B82Y 10/00 359/108 |
| 2014/0291490 | A1* | 10/2014 | Hanson | B82Y 10/00 250/214 R |
| 2015/0006443 | A1 | 1/2015 | Rose et al. | |
| 2016/0071021 | A1* | 3/2016 | Raymond | G06F 15/76 712/28 |
| 2016/0132785 | A1* | 5/2016 | Amin | G06F 15/82 712/42 |
| 2016/0191060 | A1* | 6/2016 | McDermott, III | H03K 19/195 326/3 |
| 2016/0245639 | A1 | 8/2016 | Mower et al. | |
| 2016/0267032 | A1* | 9/2016 | Rigetti | G06F 13/4068 |
| 2016/0320371 | A1 | 11/2016 | Abraham | |
| 2016/0328253 | A1* | 11/2016 | Majumdar | G06N 99/002 |
| 2016/0338075 | A1 | 11/2016 | McKibben | |
| 2017/0308803 | A1* | 10/2017 | Wallman | G06N 10/00 |
| 2017/0351967 | A1* | 12/2017 | Babbush | G06N 99/002 |
| 2017/0351974 | A1 | 12/2017 | Rose et al. | |
| 2017/0357561 | A1* | 12/2017 | Kelly | G06F 11/2236 |
| 2018/0039903 | A1* | 2/2018 | Mosca | G06N 10/00 |
| 2018/0069288 | A1* | 3/2018 | Minev | H01L 39/02 |
| 2018/0165601 | A1* | 6/2018 | Wiebe | G06N 3/0445 |
| 2018/0260732 | A1* | 9/2018 | Bloom | G06N 99/002 |
| 2018/0307783 | A1* | 10/2018 | Hah | G06F 17/505 |
| 2018/0330265 | A1* | 11/2018 | Kelly | G06N 99/002 |
| 2018/0365585 | A1* | 12/2018 | Smith | G06F 9/546 |
| 2019/0049495 | A1* | 2/2019 | Ofek | G01R 33/20 |
| 2019/0164077 | A1* | 5/2019 | Roberts | G01R 33/0354 |
| 2019/0385673 | A1* | 12/2019 | Bosman | G11C 11/44 |

OTHER PUBLICATIONS

Svore et al., A Layered Software Architecture for Quantum Computing Design Tools, 2006, Computer ( vol. 39 , Issue: 1 , Jan. 2006 ), pp. 1-10.*

Pakin et al., A Quantum Macro Assembler, Sep. 2016, 2016 IEEE High Performance Extreme Computing Conference (HPEC), pp. 1-8.*

Chapman et al., Experimental perfect state transfer of an entangled photonic qubit, 2016, Nature Communications | 7:11339 | DOI: 10.1038/ncomms11339 | www.nature.com/naturecommunications, pp. 1-6.*

Paler at al., "Tomographic Testing and Validation of Probabilistic Circuits," 2011 Sixteenth IEEE European Test Symposium, Trondheim, 2011, pp. 63-68.*

Frisch, "IBM Q Quantum Computing," IBM Systems for Cognitive Solutions—Ehningen—Jul. 12, 2017, https://www-01.ibm.com/events/wwe/grp/grp308.nsf/vLookupPDFs/07%20Quantum%20Computing%20cognitive%20event/$file/07%20Quantum%20Computing%20cognitive%20event.pdf, 32 pages.

IBM, "IBM Makes Quantum Computing Available on IBM Cloud to Accelerate Innovation," News Room, News Releases, https://www-03.ibm.com/press/us/en/pressrelease/49661.wss, May 4, 2016, 4 pages, Yorktown Heights, N.Y.

International Search Report and Written Opinion for International Application Serial No. PCT/IB2017/058117 dated Jun. 27, 2018, 10 pages.

Gambetta, et al., "Working towards QASM 2.0," Retrieved: Jan. 15, 2019, 30 pages.

Alsina, "Probabilities greater than 1?," Retrieved: Jan. 15, 2019, 5 pages.

Singh et al., "The Quantum Way of Cloud Computing", URL: http://ieeexplore.ieee.org/stamp/stamp.jsp? arnumber=6798362, 2014 International Conference on Reliability Optimization and Information Technology (ICROIT), Feb. 6-8, 2014, pp. 397-400.

International Search Report and Written Opinion received for PCT Application Serial No. PCT/IB2017/057697 dated Jun. 27, 2018, 10 pages.

Mantri et al., "Flow Ambiguity: A Path Towards Classically Driven Blind Quantum Computation", Physical Review X, 2017, 15 pages.

Office Action for U.S. Appl. No. 15/719,872 dated Aug. 31, 2020, 83 pages.

Extended European Search Report for European Application No. 17927071.5 dated Oct. 23, 2020, 8 pages.

Jun Li et al: "Optimal experiment design for quantum state tomography", ARXIV.Org, Cornell University Library, 201 Olin Library Cornell University Ithaca, NY 14853, May 3, 2017 (May 3, 2017), KP080945951, DOI: 10.1103/PHYSREVA.96.032307 * the whole document*.

Bo Qi et al: "Quantum State Tomography via Linear Regression Estimation", Scientific Reports, vol . 3, No. 1, Dec. 17, 2013 (Dec. 17, 2013), p. 67, XP055736418, DOI: 10.1038/srep03496 * the whole document*.

F. Huszar et al: " Adaptive Bayesian quantum tomography," Physical Review A (Atomic, Molecular, and Optical Physics), vol. 85, No. 5, May 1, 2012 (May 1, 2012), p. 5212005, XP055735325, USA ISSN: 1050-2947, DOI: 10.1103/PhysRevA.85.052120 * the whole document*.

Banaszek K et al: "Maximum-likelihood estimation of the density matrix" , ARXIV.Org, Cornell University Library, 201 Olin Library Cornell University Ithaca, NY 14853, Sep. 16, 1999 (Sep. 16, 1999), XP080667770, DOI: 10.1103/PHYSREVA.61.010304 * the whole document*.

* cited by examiner

FIG. 6

QUANTUM CIRCUIT DATA 112

```
qreg q[1];
H q[0];
T q[0];
H q[0];
```

↓

CIRCUIT GENERATION COMPONENT 104

↓

TOMOGRAPHY EXPERIMENT DATA 502

```
qreg q[1];
Xpi q[0];
meas q[0]; # calibrated |1> qreg q[1];
meas q[0]; # calibrated |0> qreg q[1];
H q[0];
T q[0];
H q[0];
meas q[0]; # Z-component qreg q[1];
H q[0];
T q[0];
H q[0];
X90 q[0];
meas q[0]; # Y-component qreg q[1];
H q[0];
T q[0];
H q[0];
Y90 q[0];
meas q[0]; # X-component
```

FACILITATING QUANTUM TOMOGRAPHY

BACKGROUND

The subject disclosure relates to quantum computing, and more specifically, to quantum tomography.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for facilitating quantum tomography are described.

According to an embodiment, a system can comprise a circuit generation component and a tomography analysis component. The circuit generation component can generate tomography experiment data indicative of information for a set of tomography experiments based on quantum circuit data indicative of a machine-readable description of a quantum circuit. The tomography analysis component can generate tomogram data based on experimental result data indicative of information associated with the tomography experiment data. In certain embodiments, the circuit generation component can generate calibration experiment data indicative of information for a set of calibration experiments based on the quantum circuit data. In an embodiment, the quantum circuit data can comprise textual data indicative of a text-format language that describes the quantum circuit, and the circuit generation component can generate the tomography experiment data based on the textual data. In another embodiment, the quantum circuit data can further comprise marker data indicative of information for one or more marker elements that tag one or more locations associated with the quantum circuit, and the circuit generation component can generate the tomography experiment data based on the marker data. In another embodiment, the tomography analysis component can process a set of results in response to execution of the tomography experiment data to generate the experimental result data. In another embodiment, the tomography analysis component can generate reporting data indicative of information for error reporting or quality reports associated with the tomogram data. In certain embodiments, the computer executable components further can comprise a tomography display component that renders the tomogram data on a display device as a graphical tomogram. In an embodiment, the tomography display component can provide an application programming interface for the display device that renders the tomogram data as the graphical tomogram. In an aspect, the tomogram data generated by the tomography analysis component can provide improved processing performance of the quantum circuit.

According to another embodiment, a computer-implemented method is provided. The computer-implemented method can comprise generating, by a system operatively coupled to a processor, tomography experiment data indicative of information for a set of tomography experiments based on quantum circuit data indicative of a machine-readable description of a quantum circuit. The computer-implemented method can also comprise executing, by the system, the tomography experiment data. Furthermore, the computer-implemented method can comprise generating, by the system, tomogram data based on experimental result data indicative of information associated with the executing of the tomography experiment data. In an embodiment, the executing can comprise executing the tomography experiment data via a quantum simulator. In another embodiment, the executing can comprise executing the tomography experiment data via a quantum processor. In certain embodiments, the computer-implemented method can also comprise receiving, by the system, the quantum circuit data as textual data indicative of a text-format language that describes the quantum circuit. Furthermore, in certain embodiments, the computer-implemented method can also comprise receiving, by the system, marker data indicative of information for one or more marker elements that tag one or more locations associated with the quantum circuit, where the generating the tomography experiment data can comprise generating the tomography experiment data based on the marker data. In certain embodiments, the computer-implemented method can also comprise receiving, by the system, the experimental result data via an application programming interface. In certain embodiments, the computer-implemented method can also comprise rendering, by the system, the tomogram data on a display device as a graphical tomogram. In an aspect, the generating the tomogram data can provide improved processing characteristics of the quantum circuit.

According to yet another embodiment, a computer program product for facilitating quantum tomography can comprise a computer readable storage medium having program instructions embodied therewith. The program instructions can be executable by a processor and cause the processor to generate, by the processor, tomography experiment data indicative of information for a set of tomography experiments based on quantum circuit data indicative of a machine-readable description of a quantum circuit. The program instructions can also cause the processor to generate, by the processor, tomogram data based on experimental result data indicative of information associated with the tomography experiment data. Furthermore, program instructions can also cause the processor to render, by the processor, the tomogram data on a display device as a graphical tomogram. In certain embodiments, the program instructions are further executable by the processor to cause the processor to receive, by the processor, the experimental result data via an application programming interface. In certain embodiments, the program instructions are further executable by the processor to cause the processor to render, by the processor, the tomogram data as the graphical tomogram via an application programming interface. In an aspect, the tomogram data can provide improved processing characteristics of the quantum circuit.

According to yet another embodiment, a system can comprise a circuit generation component, a tomography analysis component and a tomography display component. The circuit generation component can generate tomography experiment data indicative of information for a set of tomography experiments based on quantum circuit data indicative of a machine-readable description of a quantum circuit. The tomography analysis component can generate tomogram data based on experimental result data indicative of information associated with the tomography experiment data. The tomography display component can render the tomogram data on a display device as graphical tomogram data. In certain embodiments, the tomography display component can provide an application programming interface for the display device that renders the tomogram data as the graphical tomogram data. Furthermore, in certain embodiments, the tomography display component provides the tomography experiment data to the application programming interface. In an aspect, the graphical tomogram data can provide improved processing performance of the quantum circuit.

According to yet another embodiment, a computer-implemented method is provided. The computer-implemented method can comprise generating, by a system operatively coupled to a processor, tomography experiment data indicative of information for a set of tomography experiments based on quantum circuit data indicative of a machine-readable description of a quantum circuit. The computer-implemented method can also comprise generating, by the system, tomogram data based on experimental result data indicative of information associated with executing the tomography experiment data. Furthermore, the computer-implemented method can comprise rendering, by the system, the tomogram data on a display device as a graphical tomogram. In certain embodiments, the rendering can comprise providing an application programming interface on the display device for the graphical tomogram. In an aspect, the rendering the tomogram data can provide improved processing characteristics of the quantum circuit.

DESCRIPTION OF THE DRAWINGS

FIG. 6 illustrates an example, non-limiting system associated with a circuit generation component in accordance with one or more embodiments described herein.

DETAILED DESCRIPTION

Figure 1:
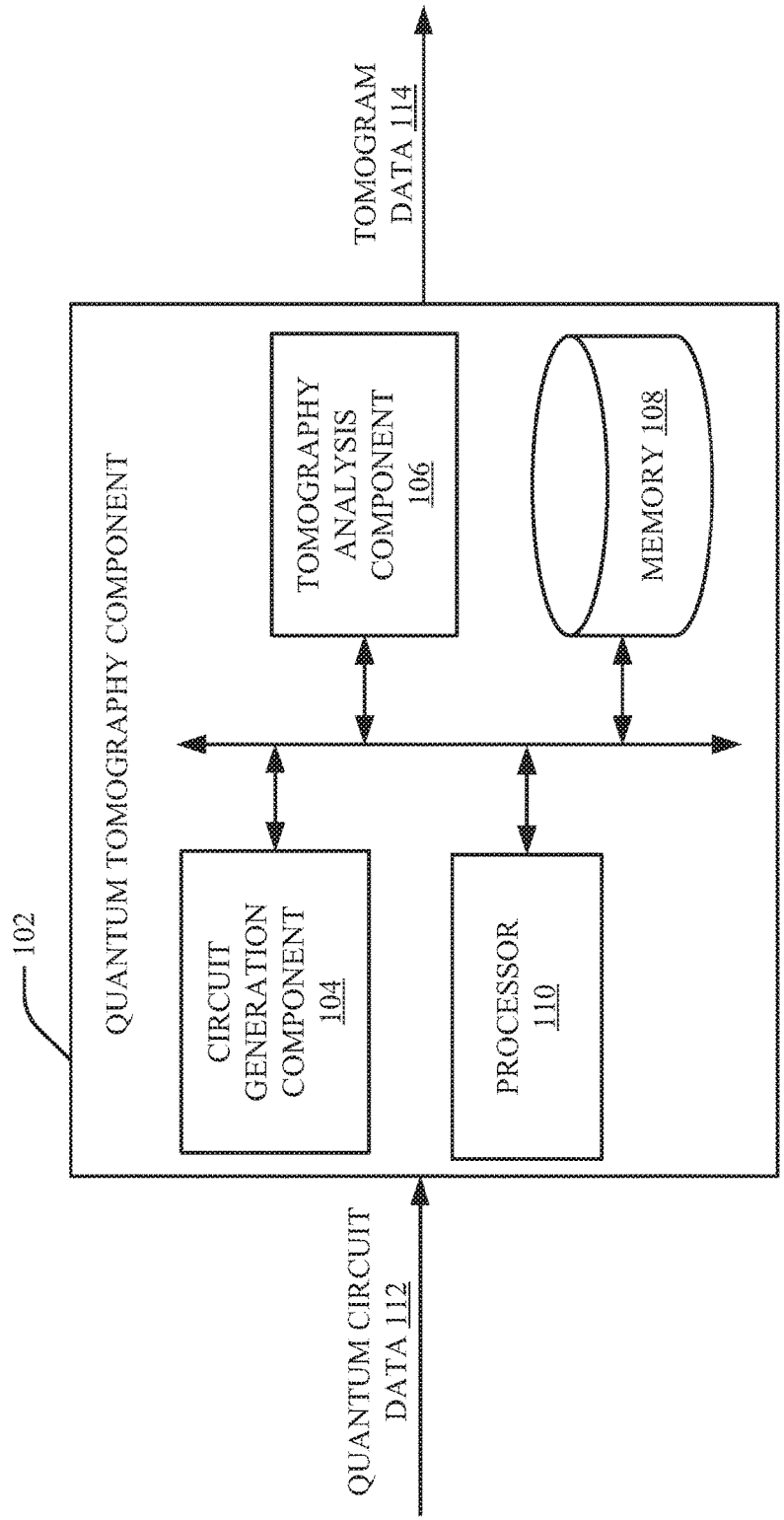
FIG. 1 illustrates a block diagram of an example, non-limiting system that includes a quantum tomography component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing employs quantum physics to encode information rather than binary digital techniques based on transistors. For example, a quantum computer can employ quantum bits (e.g., qubits) that operate according to a superposition principle of quantum physics and an entanglement principle of quantum physics. The superposition principle of quantum physics allows each qubit to represent both a value of "1" and a value of "0" at the same time. The entanglement principle of quantum physics states allows qubits in a superposition to be correlated with each other. For instance, a state of a first value (e.g., a value of "1" or a value of "0") can depend on a state of a second value. As such, a quantum computer can employ qubits to encode information rather than binary digital techniques based on transistors. For a quantum computer, quantum tomography is a process of reconstructing a quantum state, a quantum process or a quantum measurement. However, conventional quantum tomography systems are often inefficient. Furthermore, conventional quantum tomography systems can be improved.

Embodiments described herein include systems, computer-implemented methods, and computer program products for facilitating quantum tomography. In an aspect, a quantum tomography system can employ a tomography bundle and a machine-readable quantum circuit description to perform quantum tomography. The tomography bundle can include a circuit generation process and a tomography analysis process. The quantum tomography process can generate a series of tomography experiments for a quantum processor using the machine-readable quantum circuit description. Additionally or alternatively, the quantum tomography process can generate a series of calibration experiments for a quantum processor using the machine-readable quantum circuit description. The tomography analysis process can process results of the series of tomography experiments and/or the series of calibration experiments. Based on the results of the series of tomography experiments and/or the series of calibration experiments, the tomography analysis process can generate tomogram data. The tomogram data can be, for example, tomogram information associated with a quantum state, a quantum process or a quantum measurement. In certain embodiments, the tomography bundle can include a tomography display algorithm that renders the tomogram data as a graphical tomogram. As such, accuracy of a quantum tomography system and/or efficiency of a quantum tomography system can be improved. Furthermore, performance a quantum circuit and/or a quantum processor associated with a quantum tomography system can be improved, efficiency of a quantum circuit and/or a quantum processor associated with a quantum tomography system be improved, timing characteristics of a quantum circuit and/or a quantum processor associated with a quantum tomography system can be improved, power characteristics of a quantum circuit and/or a quantum processor associated with a quantum tomography system can be improved, and/or another characteristic of a quantum circuit and/or a quantum processor associated with a quantum tomography system can be improved.

FIG. 1 illustrates a block diagram of an example, non-limiting system 100 for facilitating quantum tomography in accordance with one or more embodiments described herein. In various embodiments, the system 100 can be a quantum tomography system associated with technologies such as, but not limited to, quantum tomography technologies, quantum circuit technologies, quantum processor technologies, quantum computing technologies, artificial intelligence technologies, medicine and materials technologies, supply chain and logistics technologies, financial services technologies, and/or other digital technologies. The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized computer with a quantum tomography component, etc.) for carrying out defined tasks related to machine learning. The system 100 and/or components of the system 100 can be employed to solve new problems that arise through advancements in technologies mentioned above, computer architecture, and/or the like. One or more embodiments of the system 100 can provide technical improvements to quantum tomography systems, quantum circuit systems, quantum processor systems, quantum computing systems, artificial intelligence systems, medicine and materials systems, supply chain and logistics systems, financial services systems, and/or other systems. One or more embodiments of the system 100 can also provide technical improvements to a quantum processor (e.g., a superconducting quantum processor) by improving processing performance of the quantum processor, improving processing efficiency of the quantum processor, improving processing characteristics of the quantum processor, improving timing characteristics of the quantum processor and/or improving power efficiency of the quantum processor.

In the embodiment shown in FIG. 1, the system 100 can include a quantum tomography component 102. As shown in FIG. 1, the quantum tomography component 102 can include a circuit generation component 104 and a tomography analysis component 106. Aspects of the quantum tomography component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the quantum tomography component 102 can also include memory 108 that stores computer executable components and instructions. Furthermore, the quantum tomography component 102 can include a processor 110 to facilitate execution of the instructions (e.g., computer executable components and corresponding instructions) by the quantum tomography component 102. As shown, the circuit generation component 104, the tomography analysis component 106, the memory 108 and/or the processor 110 can be electrically and/or communicatively coupled to one another in one or more embodiments.

The quantum tomography component 102 (e.g., the circuit generation component 104 of the quantum tomography component 102) can receive quantum circuit data 112. The quantum circuit data 112 can be, for example, a machine-readable description of a quantum circuit. The quantum circuit can be a model for one or more quantum computations associated with a sequence of quantum gates. In one example, the quantum circuit data 112 can include textual data indicative of a text-format language (e.g., a quantum assembly (QASM) text-format language) that describes a quantum circuit. For instance, the textual data can, for example, textually describe one or more qubit gates of a quantum circuit associated with one or more qubits. In an embodiment, the quantum circuit data 112 can additionally include marker data indicative of information for one or more marker elements that tag one or more locations associated with a quantum circuit. For example, the marker data can include one or more marker elements that tag a location of one or more qubit gates of a quantum circuit associated with one or more qubits.

In an embodiment, the circuit generation component 104 can generate tomography experiment data based on the quantum circuit data 112. The tomography experiment data can be indicative of information for a set of tomography experiments for a quantum circuit. For instance, the set of tomography experiments can be a set of steps (e.g., a thread of instructions) to be performed by the quantum circuit to determine an x-component measurement, a y-component measurement and/or a z-component measurement associated with a state of a quantum bit associated with the quantum circuit. In an embodiment, the set of tomography experiments can include a first tomography experiment to determine an x-component measurement of a quantum bit associated with the quantum circuit, a second tomography experiment to determine a y-component measurement of a quantum bit associated with the quantum circuit, and a third tomography experiment to determine an z-component measurement of a quantum bit associated with the quantum circuit.

In an aspect, experimental result data can be generated in response to execution of the set of tomography experiments associated with the tomography experiment data. In one example, the experimental result data can be generated in response to execution of the set of tomography experiments via a hardware representation of the quantum circuit. In another example, the experimental result data can be generated in response to execution of the set of tomography experiments via a quantum simulator associated with the quantum circuit. Additionally or alternatively, the tomography experiment data can include information for a set of calibration experiments associated with a quantum circuit. For instance, the circuit generation component 104 can generate calibration experiment data indicative of information for a set of calibration experiments associated with a quantum circuit. The circuit generation component 104 can generate the calibration experiment data based on the quantum circuit data. The set of set of calibration experiments can be a set of steps (e.g., a thread of instructions) to calibrate one or more characteristics of the quantum circuit. In an embodiment, the circuit generation component 104 can generate reporting data indicative of information for error reporting, logging, circuit analysis, quota management and/or other information regarding a circuit generation process associated with the circuit generation component 104. In an aspect, the reporting data can be included in metadata that is generated in response to generation of the set of topology experiments.

The tomography analysis component 106 can generate tomogram data 114 based on the experimental result data associated with the set of tomography experiments. The tomogram data 114 can be indicative of information associated with the tomography experiment data. For instance, the tomogram data 114 can include information that describes results of the set of tomography experiments. In one example, the tomogram data 114 can include an x-component measurement, a y-component measurement and a z-component measurement for a quantum bit associated with the quantum circuit. Furthermore, the tomogram data 114 can provide information associated with a quantum state, a quantum process or a quantum measurement. In an embodiment, the tomography analysis component 106 can generate reporting data indicative of information for error reporting, statistics (e.g., quality-of-fit statistics and/or other information regarding a tomography analysis process associated with the tomography analysis component 106. In an aspect, the reporting data can be included in metadata that is generated in response to execution of the set of topology experiments.

In certain embodiments, the tomography analysis component 106 can generate the tomogram data 114 based on classifications, correlations, inferences and/or expressions associated with principles of artificial intelligence. For instance, the tomography analysis component 106 can employ an automatic classification system and/or an automatic classification process to determine the tomogram data 114. In one example, the tomography analysis component 106 can employ a probabilistic and/or statistical-based analysis (e.g., factoring into the analysis utilities and costs) to learn and/or generate inferences with respect to the set of tomography experiments. In an aspect, the tomography analysis component 106 can include an inference component (not shown) that can further enhance aspects of the tomography analysis component 106 utilizing in part inference based schemes to facilitate learning and/or generating inferences associated with the set of tomography experiments. The tomography analysis component 106 can employ any suitable machine-learning based techniques, statistical-based techniques and/or probabilistic-based techniques. For example, the tomography analysis component 106 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the tomography analysis component 106 can perform a set of machine learning computations associated with generation of the tomogram data 114. For example, the tomography analysis component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to determine the tomogram data 114.

It is to be appreciated that the quantum tomography component 102 (e.g., the circuit generation component 104 and/or the tomography analysis component 106) performs a circuit generation process and/or a tomography analysis process that cannot be performed by a human (e.g., is greater than the capability of a single human mind). For example, an amount of data processed, a speed of data processed and/or data types of data processed by the quantum tomography component 102 (e.g., the circuit generation component 104 and/or the tomography analysis component 106) over a certain period of time can be greater, faster and different than an amount, speed and data type that can be processed by a single human mind over the same period of time. The quantum tomography component 102 (e.g., the circuit generation component 104 and/or the tomography analysis component 106) can also be fully operational towards performing one or more other functions (e.g., fully powered on, fully executed, etc.) while also performing the above-referenced circuit generation process and/or tomography analysis process. Moreover, tomogram data 114 generated by the quantum tomography component 102 (e.g., the circuit generation component 104 and/or the tomography analysis component 106) can include information that is impossible to obtain manually by a user. For example, a type of information included in the tomogram data 114, a variety of information included in the tomogram data 114, and/or optimization of the tomogram data 114 can be more complex than information obtained manually by a user.

Figure 2:
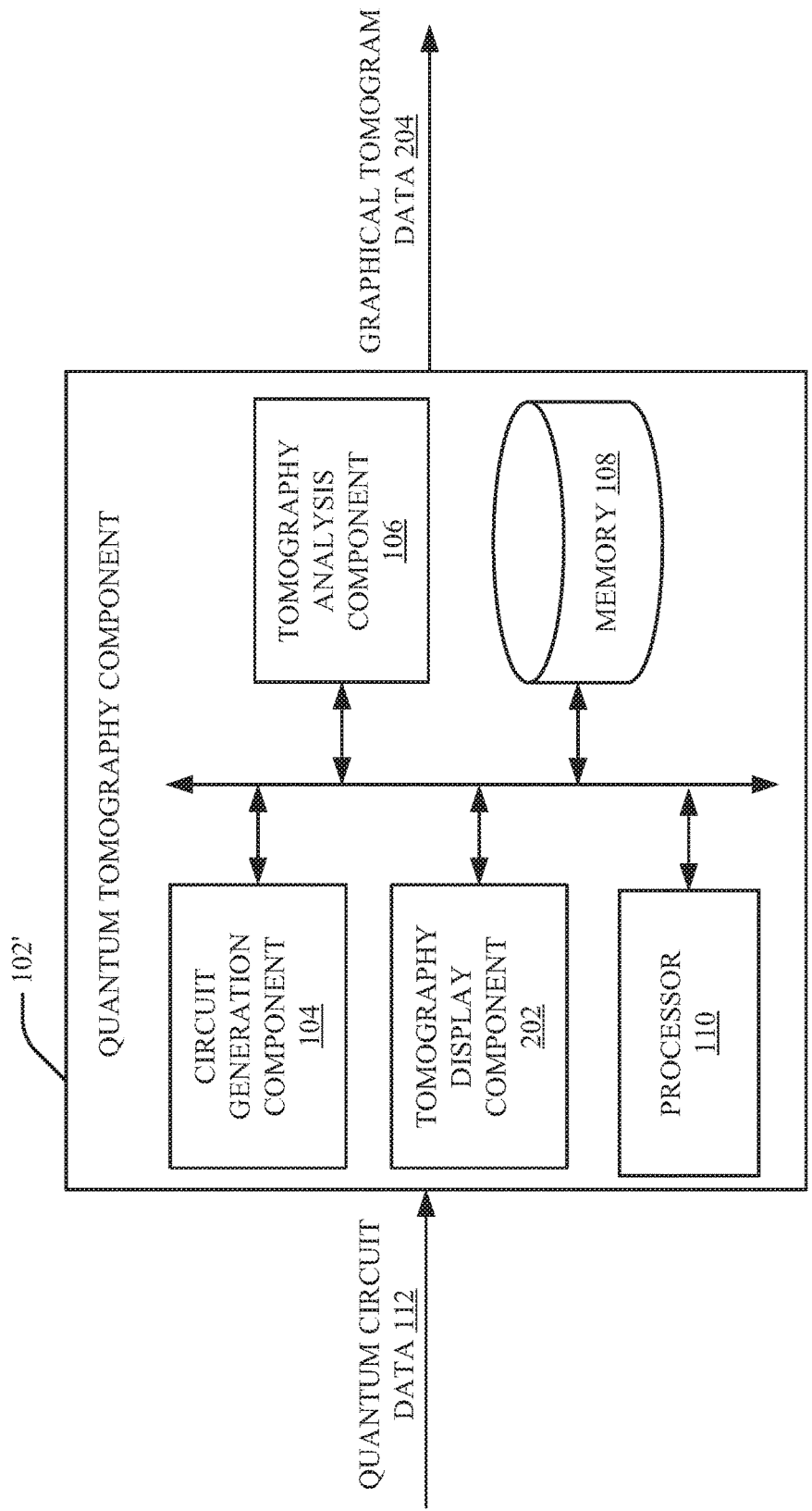
FIG. 2 illustrates a block diagram of another example, non-limiting system that includes a quantum tomography component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes quantum tomography component 102'. The quantum tomography component 102' can be an alternate embodiment of the quantum tomography component 102 shown in FIG. 1. The quantum tomography component 102' can include the circuit generation component 104, the tomography analysis component 106, a tomography display component 202, the memory 108 and/or the processor 110. The tomography display component 202 can facilitate display of graphical tomogram data 204 generated from the tomogram data 114. The graphical tomogram data 204 can be a graphical tomogram of the tomogram data 114. For instance, the tomography display component 202 can render the tomogram data 114 on a display device as the graphical tomogram data 204. In an aspect, the graphical tomogram data 204 can be a graphical representation of the tomogram data 114. For example, the graphical tomogram data 204 can include a visual representation of a qubit with a x-component measurement value, a y-component measurement value, and a z-component measurement value shown on a coordinate system associated with a geometrical representation of a qubit. In one example, the visual representation of the qubit can be a Bloch Sphere. In another example, the visual representation of the qubit can be a 3-D histogram representation (e.g., a "cityscape" 3-D histogram representation) of components of a density matrix for a quantum system. In certain embodiments, the tomography display component 202 can provide an application programming interface for a display device that renders the graphical tomogram data 204.

It is to be appreciated that the quantum tomography component 102' (e.g., the circuit generation component 104, the tomography analysis component 106 and/or the tomography display component 202) performs a circuit generation process, a tomography analysis process and/or a tomography display process that cannot be performed by a human (e.g., is greater than the capability of a single human mind). For example, an amount of data processed, a speed of data processed and/or data types of data processed by the quantum tomography component 102' (e.g., the circuit generation component 104, the tomography analysis component 106 and/or the tomography display component 202) over a certain period of time can be greater, faster and different than an amount, speed and data type that can be processed by a single human mind over the same period of time. The quantum tomography component 102' (e.g., the circuit generation component 104, the tomography analysis component 106 and/or the tomography display component 202) can also be fully operational towards performing one or more other functions (e.g., fully powered on, fully executed, etc.) while also performing the above-referenced circuit generation process, tomography analysis process and/or tomography display process. Moreover, graphical tomogram data 204 generated by the quantum tomography component 102' (e.g., the circuit generation component 104, the tomography analysis component 106 and/or the tomography display component 202) can include information that is impossible to obtain manually by a user. For example, a type of information included in the graphical tomogram data 204, a variety of information included in the graphical tomogram data 204, and/or optimization of the graphical tomogram data 204 can be more complex than information obtained manually by a user.

Figure 3:
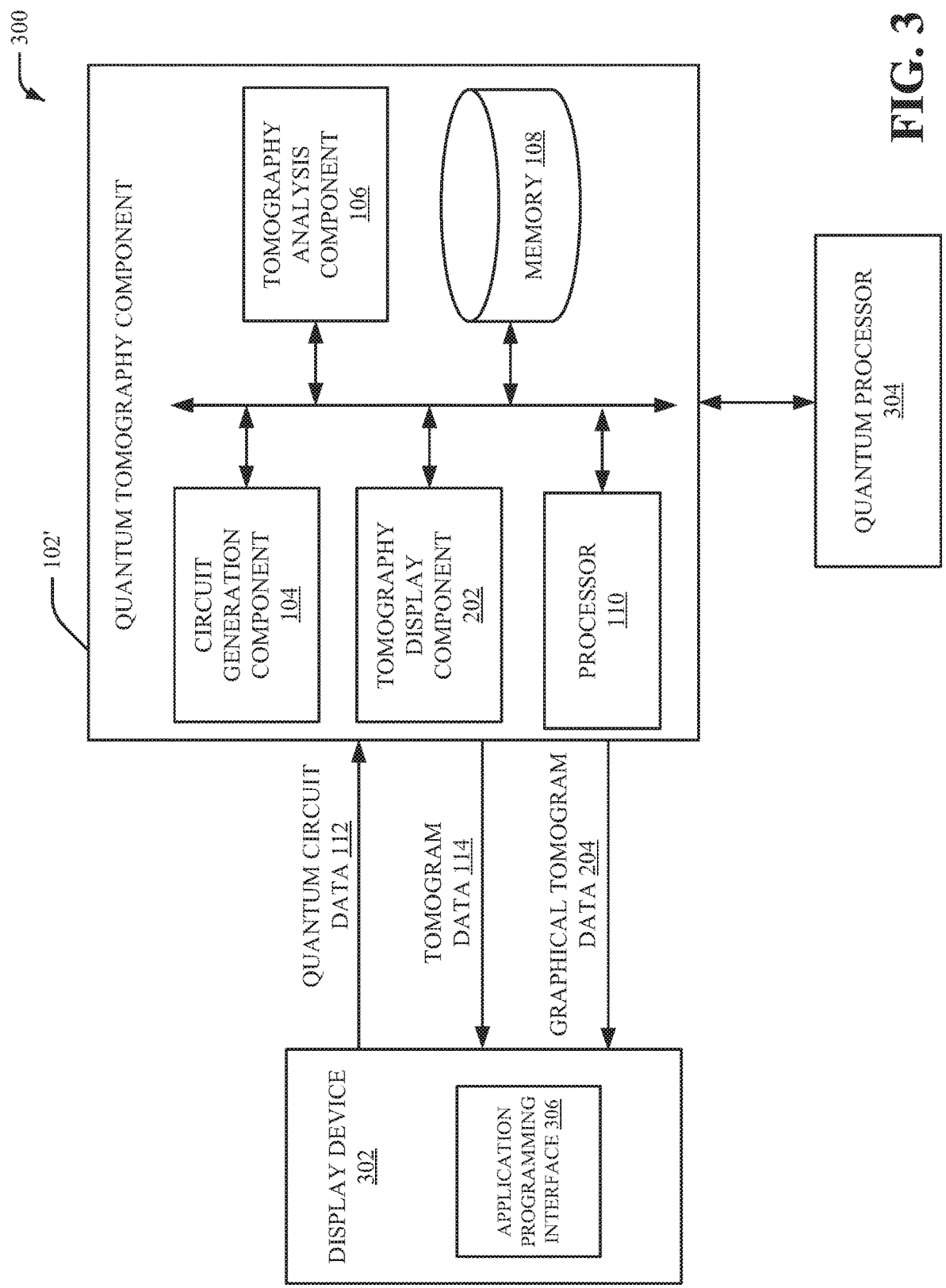
FIG. 3 illustrates a block diagram an example, non-limiting system that facilitates quantum tomography in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the quantum tomography component 102', a display device 302 and a quantum processor 304. In certain embodiments, the system 300 can alternatively include the quantum tomography component 102 rather than the quantum tomography component 102'. The quantum tomography component 102' can include the circuit generation component 104, the tomography analysis component 106, the tomography display component 202, the memory 108 and/or the processor 110. The display device 302 can include an application programming interface 306. Furthermore, the display device 302 can include, for example, a computing device with a display, a computer, a desktop computer, a laptop computer, a monitor device, a smart device, a smart phone, a mobile device, a handheld device, a tablet, a wearable device, a portable computing device or another type of device associated with a display. In certain embodiments, the display device 302 can be in communication with the quantum tomography component 102' via a network (e.g., a network device) such as, but not limited to, a local area networks (LAN), a wide area network (WAN) such as the Internet, and/or a network that provides interconnections for devices associated with a workspace environment.

The tomography display component 202 can generate the application programming interface 306. The application programming interface 306 can be associated with a display of the display device 302. In one example, the application programming interface 306 can be a tomography application programming interface to facilitate providing information and/or receiving information associated with quantum tomography. For instance, the application programming interface 306 can facilitate generation of tomography experiment data for a quantum circuit. The application programming interface 306 can additionally or alternatively facilitate display of the tomogram data 114 and/or the graphical tomogram data 204 via the display device 302. In an aspect, the application programming interface 306 can be a user interface to display, in a human interpretable format, the tomogram data 114 and/or the graphical tomogram data 204.

In another aspect, the quantum circuit data 112 can be provided to the quantum tomography component 102' (e.g., the circuit generation component 104) via the application programming interface 306. For example, the quantum tomography component 102' (e.g., the circuit generation component 104) can receive the quantum circuit data 112 via the application programming interface 306. Additionally or alternatively, the application programming interface 306 can receive the tomogram data 114 generated by the quantum tomography component 102' (e.g., the tomography analysis component 106). Additionally or alternatively, the application programming interface 306 can receive the graphical tomogram data 204 generated by the quantum tomography component 102' (e.g., the tomography display component 202). For example, the quantum tomography component 102' (e.g., the tomography display component 202) can render the tomogram data 114 and/or the graphical tomogram data 204 via the application programming interface 306.

In an embodiment, the application programming interface 306 can facilitate selection of a circuit generation process (e.g., a circuit generation algorithm) for the circuit generation component 104, a tomography analysis process (e.g., a tomography analysis algorithm) for the tomography analysis component 106, and/or a tomography display process (e.g., a tomography display algorithm) for the tomography display component 202. In an aspect, the application programming interface 306 can provide a group of circuit generation processes, a group of tomography analysis processes, and/or a group of tomography display processes to facilitate selection of a circuit generation process for the circuit generation component 104, a tomography analysis process for the tomography analysis component 106, and/or a tomography display process for the tomography display component 202. In one example, the group of circuit generation processes can include a circuit generation process associated with linear inversion, a circuit generation process associated with a Wigner tomography, a circuit generation process associated with a maximum likelihood estimate, a circuit generation process associated with a gateset tomography, a circuit generation process associated with randomized benchmarking, and/or one or more other circuit generation processes. In another example, the group of tomography analysis processes can include a tomography analysis process associated with linear inversion, a tomography analysis process associated with a Wigner tomography, a tomography analysis process associated with a maximum likelihood estimate, a tomography analysis process associated with a gateset tomography, a tomography analysis process associated with randomized benchmarking, and/or one or more other tomography analysis processes.

In certain embodiments, the tomography analysis component 106 can receive experimental result data associated with a set of tomography experiments via the application programming interface 306. In an aspect, the set of tomography experiments (e.g., the tomography experiment data associated with the set of tomography experiments) can be executed via the quantum processor 304. The quantum processor 304 can be a machine that performs a set of calculations based on principle of quantum physics. For example, the quantum processor 304 can encode information using qubits. In one embodiment, the quantum processor 304 can be a hardware quantum processor (e.g., a hardware superconducting quantum processor) that can run the set of tomography experiments associated with the tomography experiment data generated by the circuit generation component 104. For example, the quantum processor 304 can be a hardware quantum processor that executes a set of instruction threads associated with the set of tomography experiments generated by the circuit generation component 104. In another embodiment, the quantum processor 304 can be a quantum simulator that can run the set of tomography experiments associated with the tomography experiment data generated by the circuit generation component 104. For example, the quantum processor 304 can be a quantum simulator that simulates execution of the set of tomography experiments on a quantum processor. In certain embodiments, the quantum simulator can be executed via the application programming interface 306.

Figure 4:
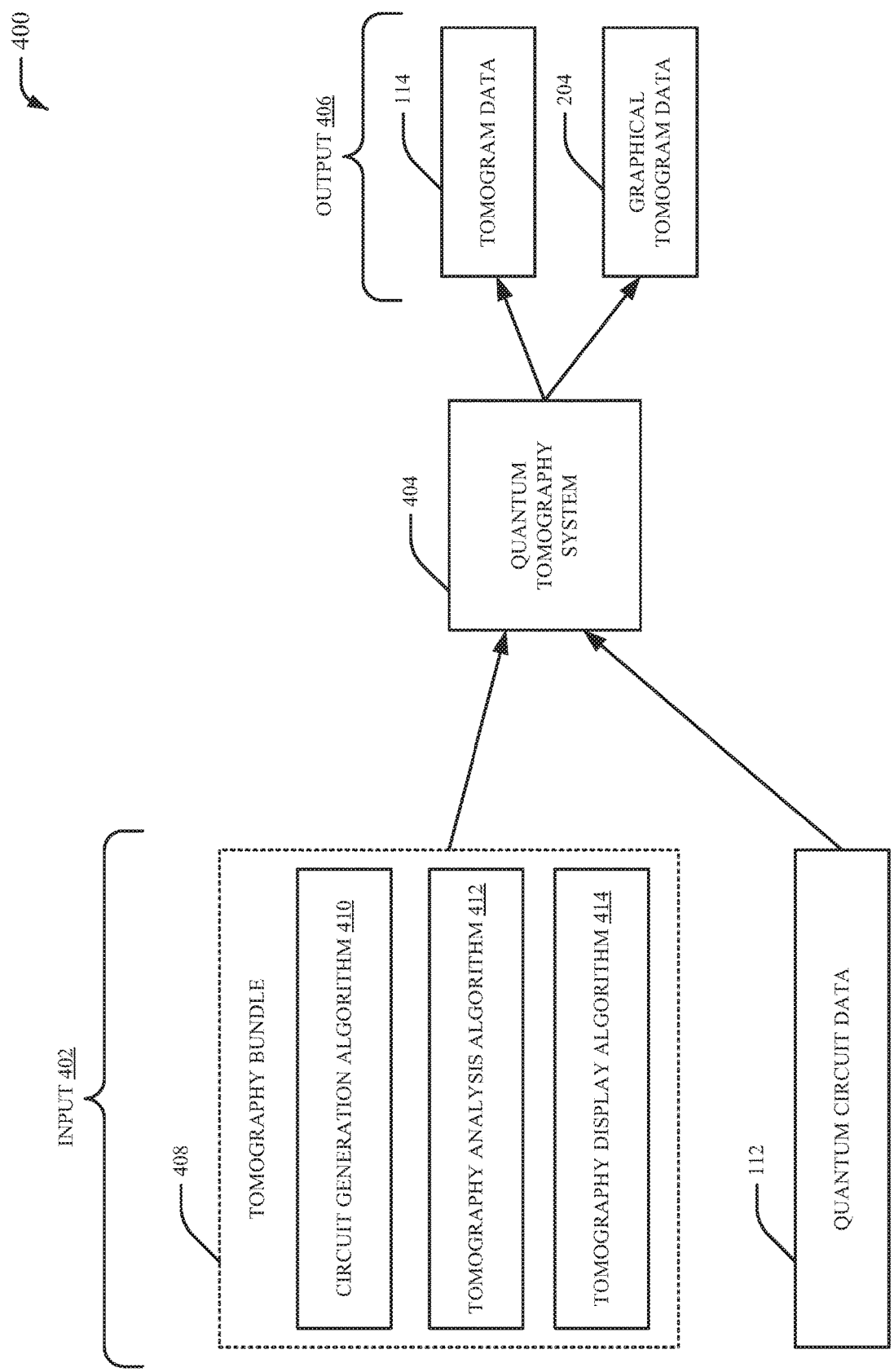
FIG. 4 illustrates a block diagram an example, non-limiting system that includes a quantum tomography system associated with facilitating quantum tomography in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes input 402, a quantum tomography system 404 and output 406. The input 402 can be input provided to the quantum tomography system 404 and the output 406 can be output generated by the quantum tomography system 404. The quantum tomography system 404 can correspond to the quantum tomography component 102 and/or the quantum tomography component 102'. In an aspect, the input 402 can include a tomography bundle 408 and the quantum circuit data 112. The tomography bundle 408 can include a circuit generation algorithm 410, a tomography analysis algorithm 412 and/or a tomography display algorithm 414. In an embodiment, the input 402 (e.g., the tomography bundle 408 and the quantum circuit data 112) can be received via an application programming interface (e.g., application programming interface 306). The circuit generation algorithm 410 can be a circuit generation process employed by the quantum tomography system 404. In one example, the circuit generation algorithm 410 can be a circuit generation process employed by the circuit generation component 104. Furthermore, the tomography analysis algorithm 412 can be a tomography analysis process employed by the quantum tomography system 404. In one example, the tomography analysis algorithm 412 can be a tomography analysis process employed by the tomography analysis component 106. The tomography display algorithm 414 can be a tomography display process employed by the quantum tomography system 404. In one example, the tomography display algorithm 414 can be a tomography display process employed by the tomography display component 202. In another aspect, the output 406 can include the tomogram data 114 and/or the graphical tomogram data 204. For instance, the quantum tomography system 404 (e.g., circuit generation component 104) can employ the circuit generation algorithm 410 and the quantum circuit data 112 to generate tomography experiment data associated with a set of tomography experiments. Furthermore, the quantum tomography system 404 (e.g., tomography analysis component 106) can generate the tomogram data 114 using the tomography analysis algorithm 412. The tomography analysis algorithm 412 can process result of the set of tomography experiments to generate the tomogram data 114. The quantum tomography system 404 (e.g., tomography display component 202) can also generate the graphical tomogram data 204 using the tomography display algorithm 414. The tomography display algorithm 414 can render the tomogram data 114 to provide the graphical tomogram data 204.

Figure 5:
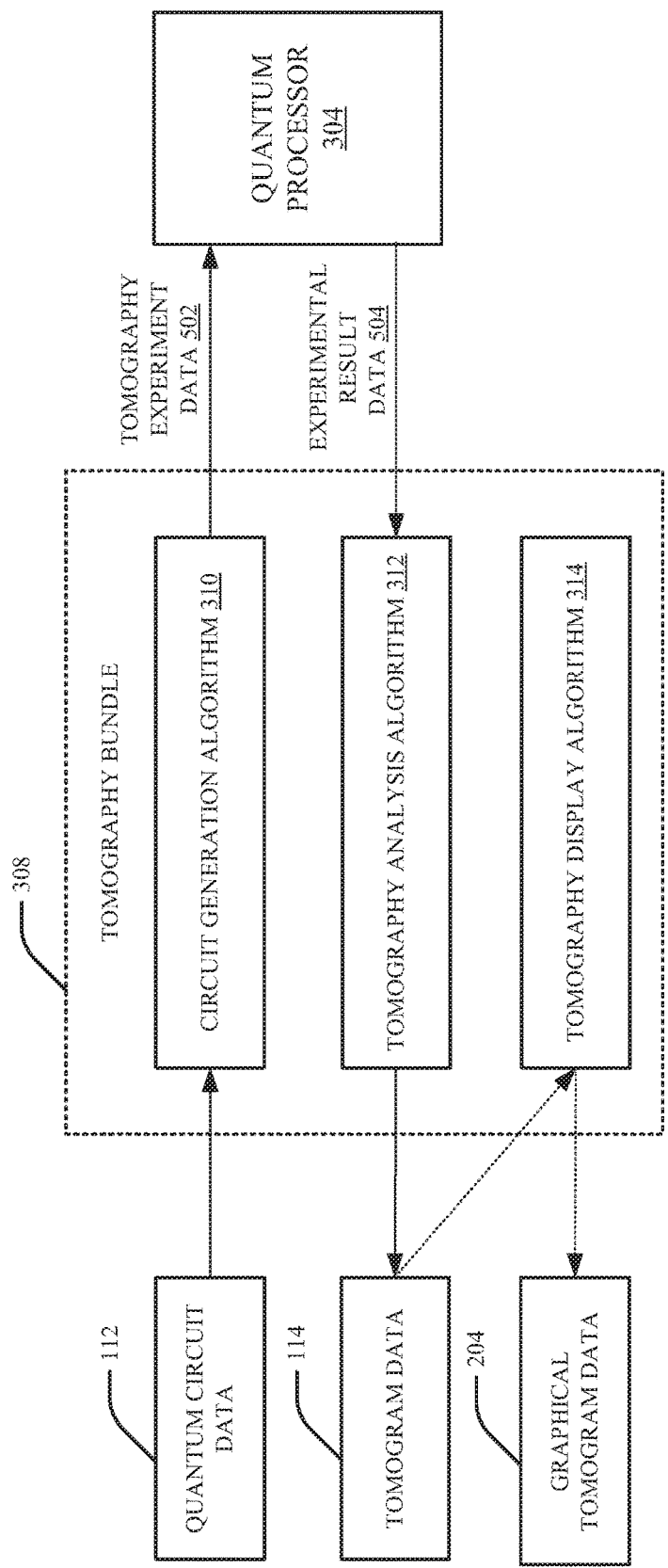
FIG. 5 illustrates an example, non-limiting system associated with a tomography bundle in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes the quantum circuit data 112, the tomogram data 114, the graphical tomogram data 204, the tomography bundle 308 and the quantum processor 304. The tomography bundle 308 can include the circuit generation algorithm 310, the tomography analysis algorithm 312 and the tomography display algorithm 314. As shown in FIG. 5, the circuit generation algorithm 310 can employ the quantum circuit data 112 to generate tomography experiment data 502. The tomography experiment data 502 can be indicative of information for a set of tomography experiments. The quantum processor 304 can employ the tomography experiment data 502 to execute the set of tomography experiments. In response execution of the set of tomography experiments (e.g., execution of the tomography experiment data 502), the quantum processor 304 can generate experimental result data 504. The experimental result data 504 can be indicative of information associated with a set of results in response to execution of the set of tomography experiments (e.g., execution of the tomography experiment data 502). The tomography analysis algorithm 312 can employ the experimental result data 504 to generate the tomogram data 114. Furthermore, the tomography display algorithm can employ the tomogram data 114 to generate the graphical tomogram data 204.

FIG. 6 illustrates a block diagram of an example, non-limiting system 600 in accordance with one or more embodiments described herein. Repetitive description of like elements employed in other embodiments described herein is omitted for sake of brevity.

The system 600 includes the circuit generation component 104. The circuit generation component 104 can receive the quantum circuit data 112. In an embodiment, the quantum circuit data 112 can be formatted as textual data indicative of a text-format language that describes a quantum circuit. For instance, the quantum circuit data 112 can be formatted as machine-readable data that provides a machine-readable description of a quantum circuit. Based on the quantum circuit data 112, the circuit generation component 104 can generate the tomography experiment data 502. The tomography experiment data 502 can be formatted as machine-readable data that provides a machine-readable description of a set of tomography experiments for the quantum circuit associated with the quantum circuit data 112. For example, the tomography experiment data 502 can include first machine-readable data that provides a machine-readable description of a first tomography experiment to determine an x-component measurement of a quantum bit associated with the quantum circuit described by the quantum circuit data 112, second machine-readable data that provides a machine-readable description of a second tomography experiment to determine a y-component measurement of a quantum bit associated with the quantum circuit described by the quantum circuit data 112, and/or third machine-readable data that provides a machine-readable description of a third tomography experiment to determine a y-component measurement of a quantum bit associated with the quantum circuit described by the quantum circuit data 112. Additionally or alternatively, the tomography experiment data 502 can include machine-readable data that provides a machine-readable description of a set of calibration experiments for the quantum circuit associated with the quantum circuit data 112. For example, the tomography experiment data 502 can include fourth machine-readable data that provides a machine-readable description of a first calibration experiment to calibrate the quantum circuit associated with the quantum circuit data 112 and/or fifth machine-readable data that provides a machine-readable description of a second calibration experiment to calibrate the quantum circuit associated with the quantum circuit data 112.

Figure 7:
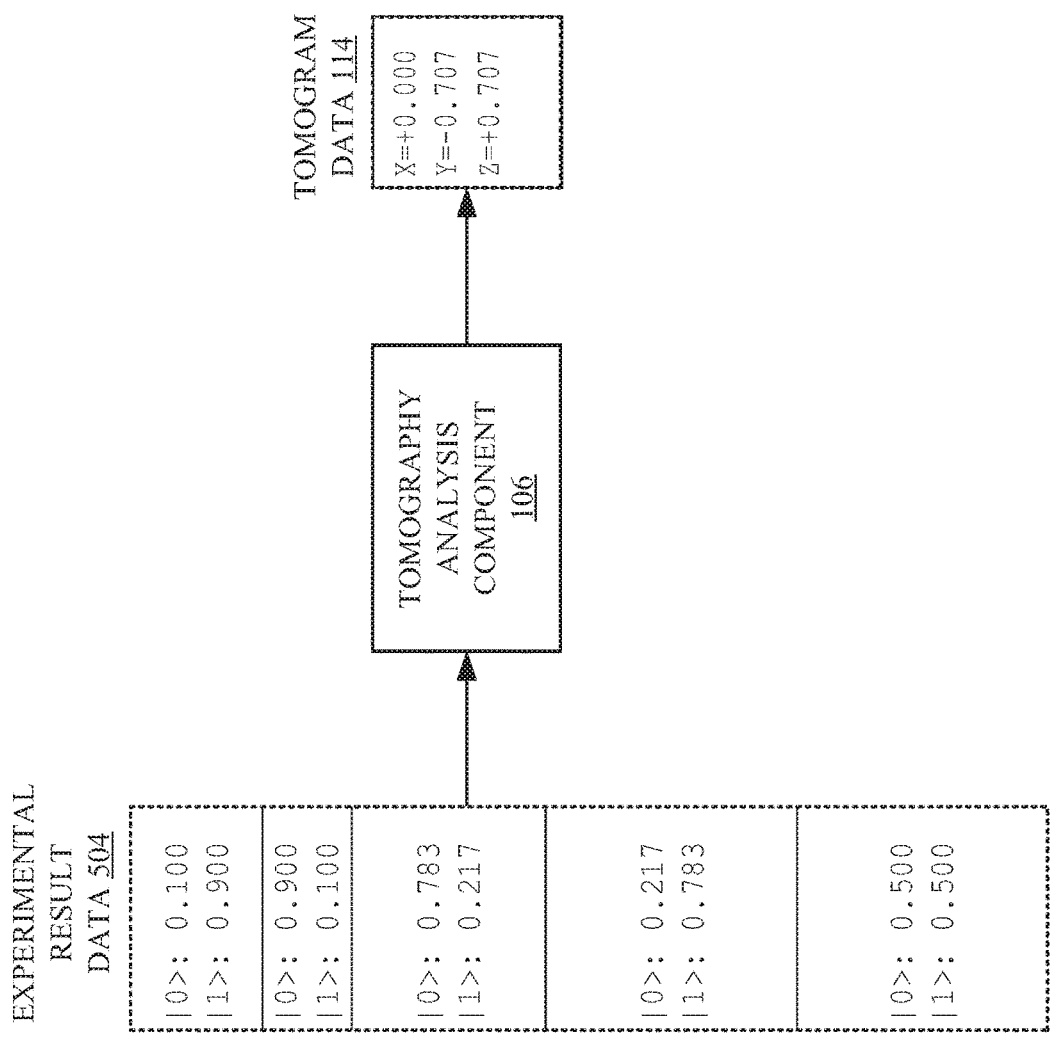
FIG. 7 illustrates an example, non-limiting system associated with a tomography analysis component in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes the tomography analysis component 106. The tomography analysis component 106 can receive the experiment result data 504. The experiment result data 504 can be formatted as machine-readable data that provides a machine-readable description of results from the set of tomography experiments for the quantum circuit associated with the quantum circuit data 112. For example, the experiment result data 504 can include first machine-readable data that provides a machine-readable description of first results for the first tomography experiment associated with the x-component measurement, second machine-readable data that provides a machine-readable description of second results for the second tomography experiment associated with the y-component measurement, and/or third machine-readable data that provides a machine-readable description of third results for the third tomography experiment associated with the z-component measurement. Additionally or alternatively, the tomography experiment data 502 can include machine-readable data that provides a machine-readable description of results for the set of calibration experiments for the quantum circuit associated with the quantum circuit data 112. For example, the tomography experiment data 502 can include fourth machine-readable data that provides a machine-readable description of results for the first calibration experiment and/or fifth machine-readable data that provides a machine-readable description of results for the second calibration experiment. Based on the experiment result data 504, the tomography analysis component 106 can generate the tomogram data 114. The tomogram data 114 can be indicative of information that describes an x-component measurement, a y-component measurement component and a z-component measurement for a quantum bit associated with the quantum circuit described by the quantum circuit data 112. For instance, the tomogram data 114 can include a x-component measurement value (e.g., X=+0.000), a y-component measurement value (e.g., Y=−0.707), and a z-component measurement value (e.g., Y=+0.707) for a coordinate system for a quantum bit associated with the quantum circuit described by the quantum circuit data 112.

Figure 8:
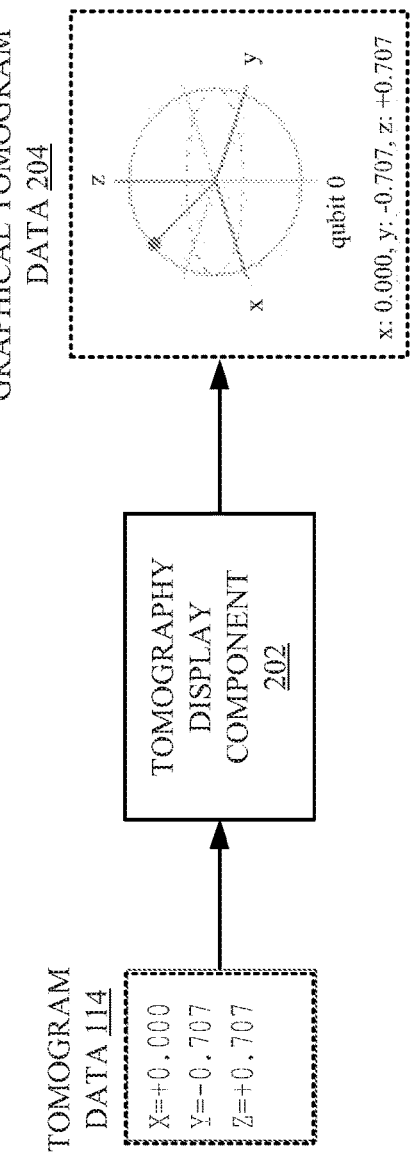
FIG. 8 illustrates an example, non-limiting system associated with a tomography display component in accordance with one or more embodiments described herein.

FIG. 8 illustrates a block diagram of an example, non-limiting system 800 in accordance with one or more embodiments described herein. Repetitive description of like elements employed in other embodiments described herein is omitted for sake of brevity.

The system 800 includes the tomography display component 202. The tomography display component 202 can receive the tomogram data 114. Based on the tomogram data 114, the tomography display component 202 can generate the graphical tomogram data 204. The graphical tomogram data 204 can be a graphical representation of the tomogram data 114. For example, the graphical tomogram data 204 can include a visual representation of a qubit with a x-component measurement value (e.g., X=+0.000), a y-component measurement value (e.g., Y=−0.707), and a z-component measurement value (e.g., Y=+0.707) shown on a coordinate system associated with a Bloch sphere. A Bloch sphere can be a geometrical representation of a qubit.

Figure 9:
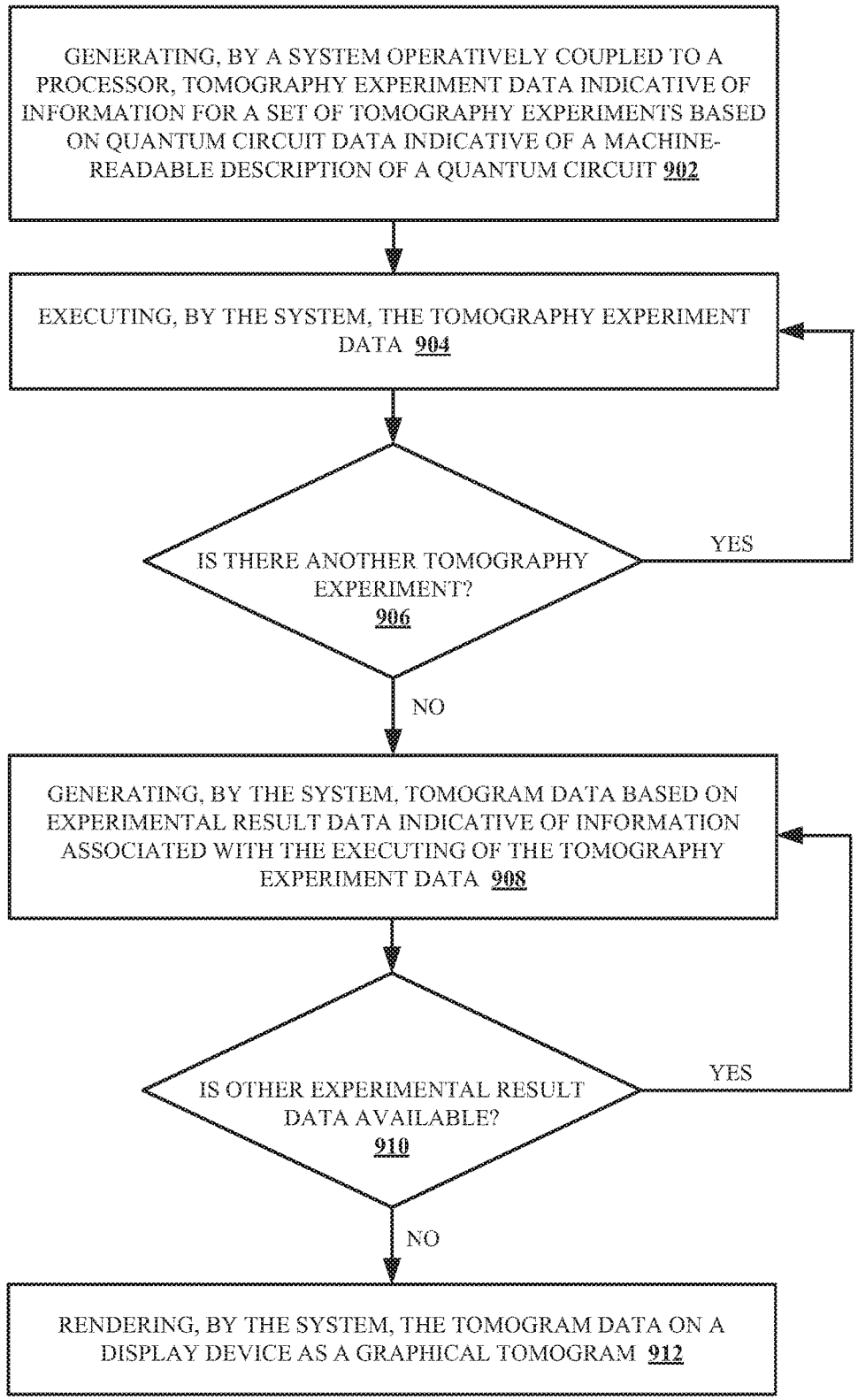
FIG. 9 illustrates a flow diagram of an example, non-limiting computer-implemented method for facilitating quantum tomography in accordance with one or more embodiments described herein.

FIG. 9 illustrates a flow diagram of an example, non-limiting computer-implemented method 900 for facilitating quantum tomography in accordance with one or more embodiments described herein. At 902, tomography experiment data indicative of information for a set of tomography experiments is generating, by a system operatively coupled to a processor (e.g., by circuit generation component 104), based on quantum circuit data indicative of a machine-readable description of a quantum circuit. In an embodiment, the quantum circuit data can be textual data indicative of a text-format language that describes the quantum circuit. In one example, the textual data can textually describe one or more qubit gates of a quantum circuit associated with one or more qubits. In another example, the quantum circuit data can be received as textual data indicative of a text-format language that describes the quantum circuit. In another embodiment, the quantum circuit data can include marker data indicative of information for one or more marker elements that tag one or more locations associated with the quantum circuit. In one example, the quantum circuit data can be received as marker data indicative of information for one or more marker elements that tag one or more locations associated with the quantum circuit. Furthermore, the tomography experiment data can be generated based on the marker data.

At 904, the tomography experiment data is executed by the system (e.g., by quantum processor 304). In one example, the tomography experiment data can be executed via a quantum processor (e.g., a hardware quantum processor). For instance, the quantum processor can be a hardware quantum processor that executes a set of instruction threads associated with the tomography experiment data (e.g., the set of tomography experiments associated with the tomography experiment data). In another example, the tomography experiment data can be executed via a quantum simulator. For example, the quantum simulator can simulate execution of the tomography experiment data (e.g., the set of tomography experiments associated with the tomography experiment data) on a simulated quantum processor.

At 906, it is determined whether there is another tomography experiment. For example, it can be determined whether the tomography experiment data includes another tomography experiment that hasn't been executed. If yes, the method 900 returns to 904 to execute the other tomography experiment. If no, the method 900 proceed to 908.

At 908, tomogram data is generating, by the system (e.g., by tomography analysis component 106), based on experimental result data indicative of information associated with the executing of the tomography experiment data. For example, the tomogram data can include information that describes results of the set of tomography experiments. In one example, the tomogram data can include an x-component measurement, a y-component measurement and a z-component measurement for a quantum bit associated with the quantum circuit. In an embodiment, the experimental result data can be received via an application programming interface.

At 910, it is determined whether other experimental result data is available. For example, it can be determined whether a tomography experiment has generated other experimental result data not included in the tomogram data. If yes, the method 900 returns to 908 to generate updated tomogram data. If no, the method 900 proceed to 912.

At 912, the tomogram data is rendered, by the system (e.g., by tomography display component 202), on a display device as a graphical tomogram. The graphical tomogram can be a graphical representation of the tomogram data. For example, the graphical tomogram can include a visual representation of a qubit with a x-component measurement value, a y-component measurement value, and a z-component measurement value provided in a coordinate system associated with a geometrical representation of a qubit. In an embodiment, the graphical tomogram can be presented via an application programming interface of the display device.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least generating tomography experiment data, executing tomography experiment data, generating tomogram data, rendering tomogram data as a graphical tomogram, etc. are established from a combination of electrical and mechanical components and circuitry, a human is unable to replicate or perform processing performed by the quantum tomography component 102 and/or the quantum tomography component 102' (e.g., the circuit generation component 104, the tomography analysis component 106, and/or the tomography display component 202) disclosed herein. For example, a human is unable to generate tomography experiment data, execute tomography experiment data, generate tomogram data, render tomogram data as a graphical tomogram, etc.

Figure 10:
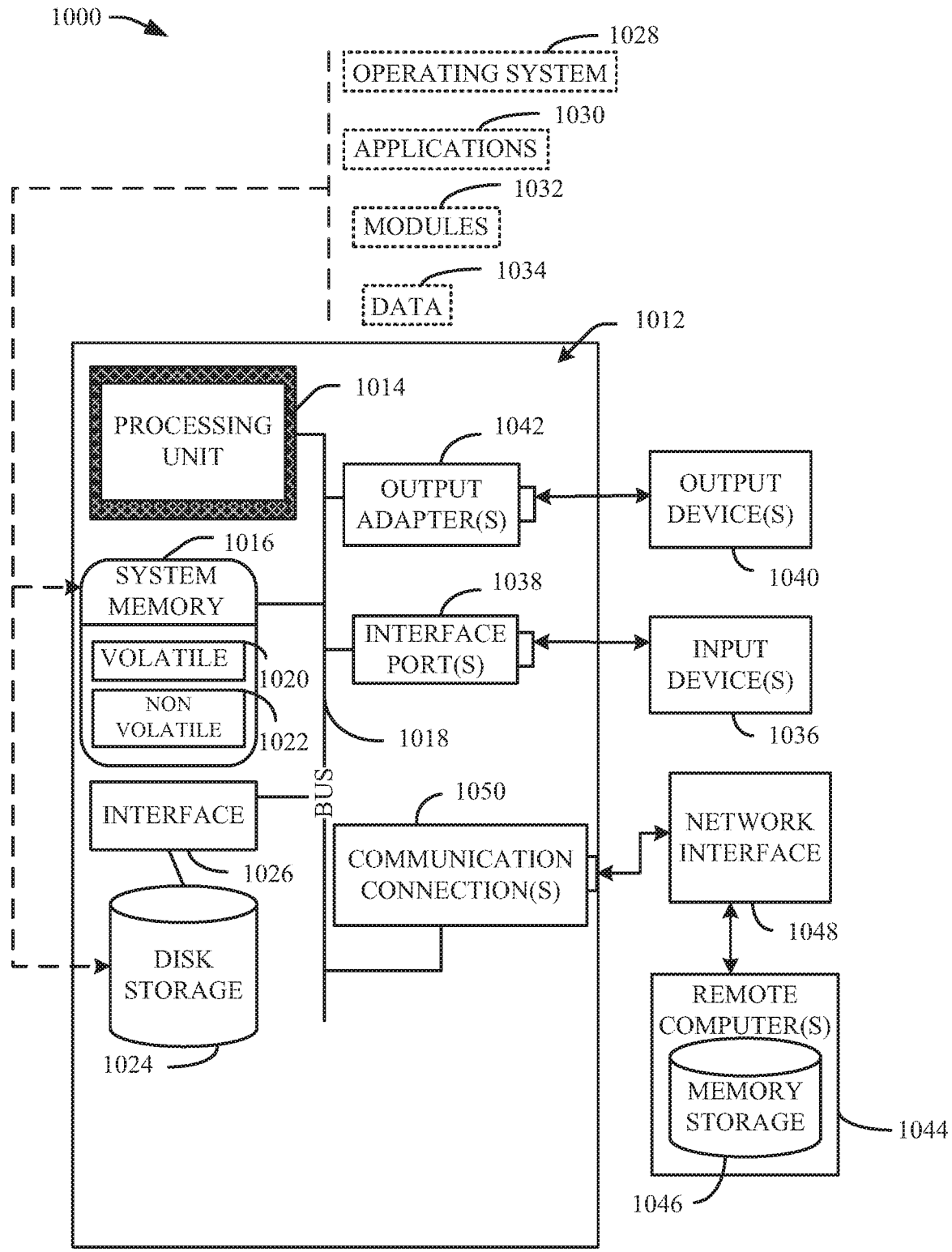
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
a circuit generation component that generates tomography experiment data describing a set of tomography experiments to execute on a quantum circuit based on quantum circuit data comprising a machine-readable description of the quantum circuit, wherein the machine-readable description of the quantum circuit comprises textual data describing one or more qubit gates of the quantum circuit, and the textual data is in a quantum assembly language format, and wherein the quantum circuit data further comprises marker data comprising one or more marker elements that tag one or more locations of the one or more qubit gates of the quantum circuit associated with one or more qubits,
a tomography analysis component that generates tomogram data based on experimental result data associated with execution of the tomography experiment data and based on the marker data, wherein the tomogram data comprises information that describes results of the set of tomography experiments, information associated with a quantum state and reporting data indicative of error reporting, and wherein the reporting data is included in metadata generated in response to execution of the set of tomography experiments; and
a tomography display component that provides an application programming interface to render the tomogram data as a graphical tomogram.

2. The system of claim 1, wherein the circuit generation component generates calibration experiment data describing a set of calibration experiments to execute on the quantum circuit based on the quantum circuit data.

3. The system of claim 1, wherein the set of tomography experiments comprises:
a first tomography experiment that determines an x-component measurement of a quantum bit of the quantum circuit;
a second tomography experiment that determines a y-component measurement of a quantum bit of the quantum circuit;
a third tomography experiment that determines a z-component measurement of a quantum bit of the quantum circuit.

4. The system of claim 1, wherein the circuit generation component generates the tomography experiment data based on the marker data.

5. The system of claim 1, wherein the tomography analysis component processes a set of results in response to the execution of the tomography experiment data to generate the experimental result data.

6. The system of claim 1, wherein the tomography analysis component generates reporting data for error reporting or quality reports associated with the tomogram data.

7. The system of claim 1, wherein the tomography display component provides the graphical tomogram as a visual representation of a qubit.

8. The system of claim 1, wherein the tomogram data generated by the tomography analysis component provides improved processing performance of the quantum circuit.

9. A computer-implemented method, comprising:
generating, by a system operatively coupled to a processor, tomography experiment data describing a set of tomography experiments to execute on a quantum circuit based on quantum circuit data comprising a machine-readable description of the quantum circuit, wherein the machine-readable description of the quantum circuit comprises textual data describing one or more qubit gates of the quantum circuit, and the textual data is in a quantum assembly language format, and wherein the quantum circuit data further comprises marker data comprising one or more marker elements that tag one or more locations of the one or more qubit gates of the quantum circuit associated with one or more qubits, wherein the tomogram data comprises information that describes results of the set of tomography experiments and reporting data indicative of error reporting, and wherein the reporting data is included in metadata generated in response to execution of the set of tomography experiments;
executing, by the system, the tomography experiment data;
generating, by the system, tomogram data based on experimental result data associated with the executing of the tomography experiment data; and
rendering, by the system, an application programming interface to provide the tomogram data as a graphical tomogram.

10. The computer-implemented method of claim 9, wherein the executing comprises executing the tomography experiment data via a quantum simulator.

11. The computer-implemented method of claim 9, wherein the executing comprises executing the tomography experiment data via a quantum processor.

12. The computer-implemented method of claim 9, wherein the set of tomography experiments comprises:
a first tomography experiment that determines an x-component measurement of a quantum bit of the quantum circuit;
a second tomography experiment that determines a y-component measurement of a quantum bit of the quantum circuit;
a third tomography experiment that determines a z-component measurement of a quantum bit of the quantum circuit.

13. The computer-implemented method of claim 9, wherein the generating the tomography experiment data comprises generating the tomography experiment data based on the marker data.

14. The computer-implemented method of claim 9, further comprising:
receiving, by the system, the experimental result data via the application programming interface.

15. The computer-implemented method of claim 9, wherein the rendering comprises providing the graphical tomogram as a visual representation of a Bloch sphere associated with a qubit.

16. The computer-implemented method of claim 9, wherein the generating the tomogram data provides improved processing characteristics of the quantum circuit.

17. A computer program product for facilitating quantum tomography, the computer program product comprising a computer readable storage medium having program instructions embodied therewith, the program instructions executable by a processor to cause the processor to:
generate, by the processor, tomography experiment data describing a set of tomography experiments to execute on a quantum circuit based on quantum circuit data comprising a machine-readable description of the quantum circuit, wherein the machine-readable description of the quantum circuit comprises textual data describing one or more qubit gates of the quantum circuit, and the textual data is in a quantum assembly language format, and wherein the quantum circuit data further comprises marker data comprising one or more marker elements that tag one or more locations of the one or more qubit gates of the quantum circuit associated with one or more qubits, wherein the tomogram data is generated based on artificial intelligence automatic classifications that determine the tomogram data and the processor employs statistical-based analysis to generate inferences with regard to the set of tomography experiments;
generate, by the processor, tomogram data based on experimental result data associated with execution of the tomography experiment data; and
render, by the processor, a graphical representation of the tomogram data on a display device.

18. The computer program product of claim 17, wherein the program instructions are further executable by the processor to cause the processor to:
receive, by the processor, the experimental result data via an application programming interface.

19. The computer program product of claim 17, wherein the program instructions are further executable by the processor to cause the processor to:
render, by the processor, the graphical representation of the tomogram data via an application programming interface.

20. A system, comprising:
a memory that stores computer executable components;
a processor that executes computer executable components stored in the memory, wherein the computer executable components comprise:
a circuit generation component that generates tomography experiment data describing a set of tomography experiments to execute on a quantum circuit based on quantum circuit data comprising a machine-readable description of the quantum circuit, wherein the machine-readable description of the quantum circuit comprises textual data describing one or more qubit gates of the quantum circuit, and the textual data is in a quantum assembly language format, and wherein the quantum circuit data further comprises marker data comprising one or more marker elements that tag one or more locations of the one or more qubit gates of the quantum circuit associated with one or more qubits;
a tomography analysis component that generates tomogram data based on experimental result data associated with execution of the tomography experiment data, wherein the tomogram data is generated based on artificial intelligence automatic classifications that determine the tomogram data and the processor employs statistical- based analysis to generate inferences with regard to the set of tomography experiments; and
a tomography display component that renders a graphical representation of the tomogram data on a display device.

21. The system of claim 20, wherein the tomography display component provides an application programming interface for the display device that renders the graphical representation of the tomogram data.

22. The system of claim 21, wherein the tomography display component provides the tomography experiment data to the application programming interface.

23. A computer-implemented method, comprising:
generating, by a system operatively coupled to a processor, tomography experiment data describing a set of tomography experiments to execute on a quantum circuit based on quantum circuit data comprising a machine-readable description of the quantum circuit, wherein the machine-readable description of the quantum circuit comprises textual data describing one or more qubit gates of the quantum circuit, and the textual data is in a quantum assembly language format, and wherein the quantum circuit data further comprises marker data comprising one or more marker elements that tag one or more locations of the one or more qubit gates of the quantum circuit associated with one or more qubits;
generating, by the system, tomogram data based on experimental result data comprising information associated with executing the tomography experiment data, wherein the tomogram data is generated based on artificial intelligence automatic classifications that determine the tomogram data and the processor employs statistical-based analysis to generate inferences with regard to the set of tomography experiments; and rendering, by the system, the tomogram data on a display device as a graphical tomogram.

24. The computer-implemented method of claim 23, wherein the rendering comprises providing an application programming interface on the display device for the graphical tomogram.

25. The system of claim 1, wherein the tomography analysis component executes a tomography analysis process associated with error reporting based on the experimental result data.

* * * * *